J. B. CLAY & W. J. HOGUE.
COTTON SEED SEPARATOR.
APPLICATION FILED MAR. 15, 1911.
1,010,235.
Patented Nov. 28, 1911.
2 SHEETS—SHEET 1.
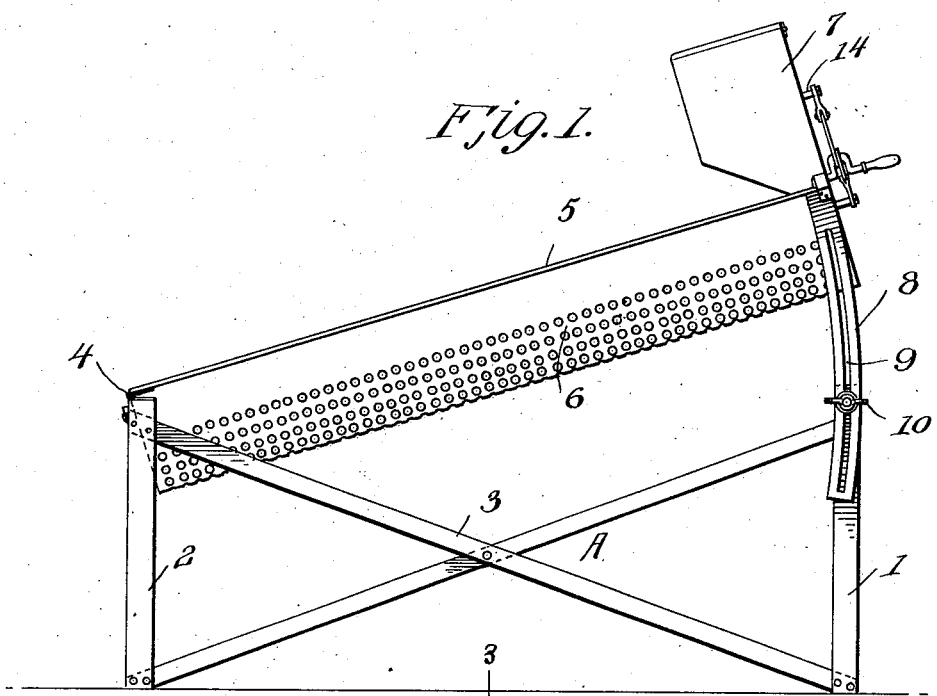
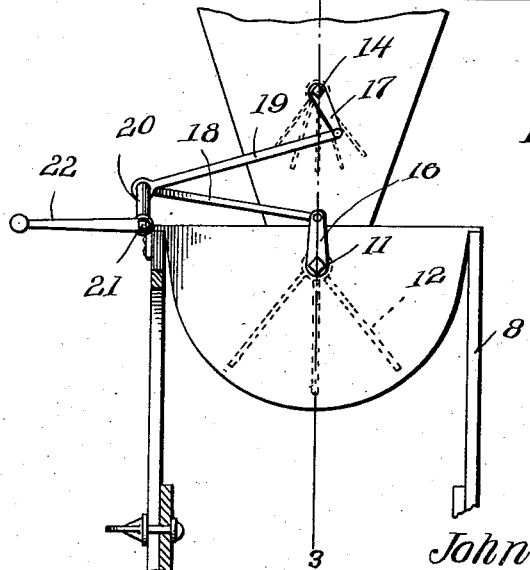
Witnesses
William Smith.
Wm. Bagger.
Inventors
John B. Clay.
William J. Hogue.
By Victor J. Evans
Attorney J. B. CLAY & W. J. HOGUE.
COTTON SEED SEPARATOR.
APPLICATION FILED MAR. 15, 1911.
1,010,235.
Patented Nov. 28, 1911.
2 SHEETS—SHEET 2.
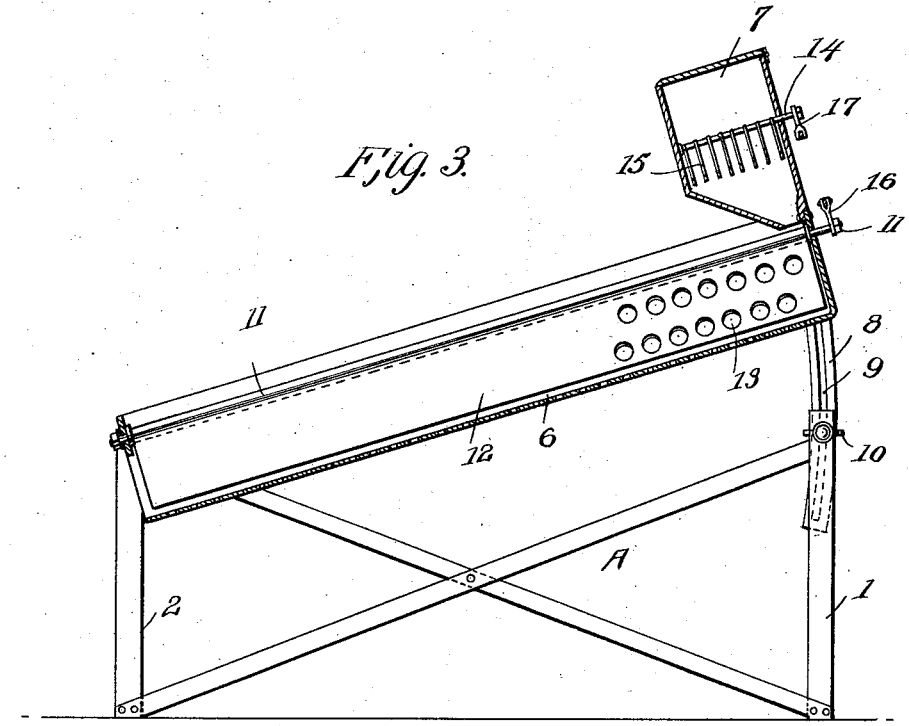
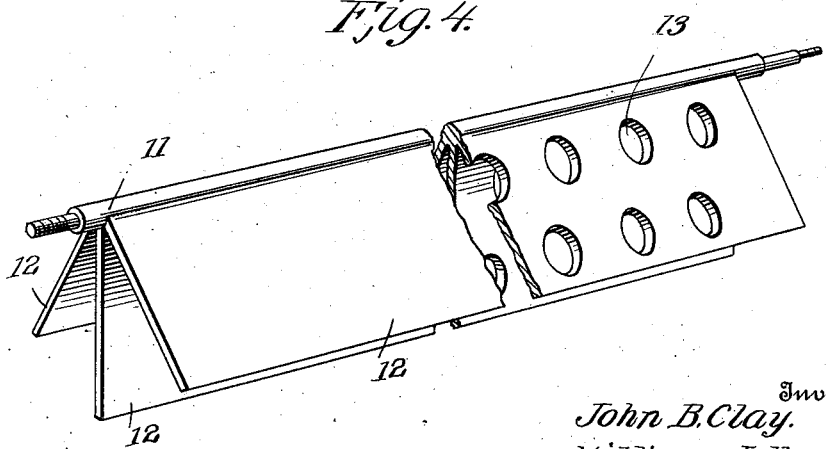
Inventors
John B. Clay.
William J. Hogue.
By Victor J. Evans
Attorney
Witnesses
William Smith.

UNITED STATES PATENT OFFICE.

JOHN B. CLAY AND WILLIAM J. HOGUE, OF SHELBY, NORTH CAROLINA.

COTTON-SEED SEPARATOR.

1,010,235.   Specification of Letters Patent.   Patented Nov. 28, 1911.

Application filed March 15, 1911. Serial No. 614,660.

*To all whom it may concern:*

Be it known that we, JOHN B. CLAY and WILLIAM J. HOGUE, citizens of the United States of America, residing at Shelby, in the county of Cleveland and State of North Carolina, have invented new and useful Improvements in Cotton-Seed Separators, of which the following is a specification.

This invention relates to cotton seed separators.

In selecting cotton seed for planting, it is desirable to separate the large and perfect seeds from the small and imperfect ones.

The invention has for its object to provide a machine of simple and inexpensive construction whereby this result may be attained quickly and efficiently.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side elevation of a machine constructed in accordance with the invention. Fig. 2 is an end view of the same. Fig. 3 is a longitudinal vertical sectional view. Fig. 4 is a perspective detail view of the shaft carrying the wings or brush members whereby the seeds are separated.

Corresponding parts in the several figures are denoted by like characters of reference.

A designates a base frame or supporting device of suitable construction including front and rear uprights 1 and 2 which may be suitably connected together by diagonal braces 3. Adjustably connected with the rear upright 2 by means of a hinge 4 is a frame structure 5 supporting a semi-cylindrical screen 6 which may be made of perforated sheet metal, wire netting or any other suitable foraminous material having openings or apertures of a size that will admit of the passage of small and defective seeds, while large and perfect seeds will pass over the tail end of such screen. The frame structure 5 supports a hopper 7, whereby the seed that is to be separated may be supplied to the screen, said hopper being supported above and adjacent to the front end of the screen. The frame 5 is provided with braces 8 having arcuate slots 9 that are engaged by fastening members, such as thumb screws 10 which are connected with the front uprights 1 of the base frame A and whereby the tiltable frame 5 may be secured at any desired adjustment.

A shaft 11, which is supported for oscillation upon the frame 5 in concentric relation to the cylindrical screen 6, is equipped with a plurality of wings or brush members 12 adapted to wipe over the upper surface of the screen. The wings or brush members are provided adjacent to the front end of the machine with apertures 13 which are of ample size to admit of the passage of seeds therethrough, it being understood that one or more seeds may pass simultaneously through the apertures 13. The portions of the wings or brush members 12 adjacent to the rear end of the machine are imperforate, as shown.

Supported for oscillation in the hopper 7 in parallel relation with the shaft 11 is a rock shaft 14 which is equipped with radially extending fingers or agitators 15. The shafts 14 and 11 are provided at their rear ends with radially extending crank arms 16, 17 which are connected by links 18, 19 with a crank 20 upon a suitably supported operating shaft 21 which is equipped with a handle 22 whereby it may be conveniently rotated, thereby transmitting oscillatory motion to the rock shafts 11 and 14.

In the operation of this invention, the seed that is to be separated is placed in the hopper 7 which is arranged in such a position as to discharge into the front end of the cylindrical screen 6. The latter is supported in a downwardly and rearwardly tilted position, as shown, the degree of inclination being readily regulated by the adjusting screws 10 engaging the slots 9 in the brace members 8. By rotating the shaft 21 the shafts 11 and 14 will be oscillated, and the seed contained in the hopper will be loosened and fed by the fingers or agitators 15 passing into the upper end of the semicylindrical screen or trough 6 where it will be subjected to the rubbing action of the wings or brush members 12 that extend radially from the rock shaft 11. The small and imperfect seeds will thus be forced through the screen, and the large and perfect seeds gradually pass over the slot or incline of the screen and be discharged over the lower rear end of the latter. The front or upper portions of the wings or brush members being provided with relatively large apertures 13 will admit of the passage of seeds therethrough, and the mass of seeds will thus be broken up in such a manner that it may be effectively operated upon by the separating devices.

It will be observed that this machine is adapted particularly to operate in connection with cotton seed which may be thereby effectively separated, the large and perfect seeds being selected for propagation.

Having thus described the invention, what is claimed as new, is:—

1. In a machine of the character described, a screen of arcuate cross section, means for supporting said screen with its axis in an inclined position, a rock shaft supported axially with reference to the screen and having brush members wiping the surface of the screen, and means including seed stirring means for supplying seed to the upper end of the screen to be operated upon by the brush members; the parts of said brush members adjacent to the receiving end of the screen being provided with apertures of greater area than the meshes or openings of the screen.

2. In a machine of the character described, a screen of arcuate cross section, means for supporting said screen with its axis in an inclined position, a feeding device adjacent to the upper end of the screen, and a rocking brush member engaging the surface of the screen, said brush member being provided adjacent to the receiving end of the screen with apertures of greater area than the screen apertures.

In testimony whereof we affix our signatures in presence of two witnesses.

JOHN B. CLAY.
WILLIAM J. HOGUE.

Witnesses:
J. F. LEDFORD,
R. A. HOYLE.

Copies of this patent may be obtained for five cents each, by addressing the "Commissioner of Patents, Washington, D. C."